US012766848B2

(12) United States Patent
Tani et al.

(10) Patent No.: US 12,766,848 B2
(45) Date of Patent: Oct. 20, 2026

(54) INK SUPPLIER

(71) Applicant: SCREEN Holdings Co., Ltd., Kyoto (JP)

(72) Inventors: Kazuma Tani, Kyoto (JP); Ichiro Hassaka, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 96 days.

(21) Appl. No.: 19/026,943

(22) Filed: Jan. 17, 2025

(65) Prior Publication Data

US 2025/0296347 A1 Sep. 25, 2025

(30) Foreign Application Priority Data

Mar. 22, 2024 (JP) ................................ 2024-046460

(51) Int. Cl.
*B41J 2/175* (2006.01)
*B41J 2/18* (2006.01)
*B41J 29/377* (2006.01)

(52) U.S. Cl.
CPC ........... *B41J 2/17596* (2013.01); *B41J 2/175* (2013.01); *B41J 2/17566* (2013.01); *B41J 2/18* (2013.01); *B41J 29/377* (2013.01)

(58) Field of Classification Search
CPC ...... B41J 2/17596; B41J 2/17566; B41J 2/18; B41J 29/377; B41J 2/175
See application file for complete search history.

(56) References Cited

U.S. PATENT DOCUMENTS

2009/0174735 A1* 7/2009 Yamada ............... B41J 2/17596 347/7
2009/0195588 A1* 8/2009 Ogama .................... B41J 2/175 347/17
2015/0022572 A1* 1/2015 Nishiyama ............ B41J 29/393 347/7

FOREIGN PATENT DOCUMENTS

JP 2014-151528 A 8/2014
JP 2022188505 A * 12/2022 ................ B41J 2/18
WO WO-2017094518 A1 * 6/2017 ................ B41J 2/18

* cited by examiner

*Primary Examiner* — Yaovi M Ameh
(74) *Attorney, Agent, or Firm* — Rimon P.C.

(57) ABSTRACT

An ink supplier includes an ink tank, an ink supply route and an ink feedback route along which ink is circulated between the ink tank and a head, an ink heater that heats the ink in the ink tank, and an external tank storing the ink to be supplied to the ink tank. A controller allows the ink to be replenished from the external tank to the ink tank in a flow rate regulation mode in which a flow rate is regulated in such a manner that the temperature of the ink in the ink tank falls within a predetermined temperature range. A regulation flow rate for ink replenishment in the flow rate regulation mode is calculated on the basis of at least the temperature in the ink tank and an ink storage amount.

7 Claims, 6 Drawing Sheets

INK SUPPLIER

RELATED APPLICATIONS

This application claims the benefit of Japanese Application No. 2024-046460, filed on Mar. 22, 2024, the disclosure of which is incorporated by reference herein.

BACKGROUND OF THE INVENTION

Field of the Invention

The present invention relates to an ink supplier that supplies ink to an inkjet head in an inkjet printing apparatus.

Description of the Background Art

Some types of ink used in an inkjet printing apparatus cause a precipitate easily as a result of agglomeration of a component in the ink. For example, ink of a watercolor pigment type to agglomerate easily is used as ink for flexible packaging.

In the inkjet printing apparatus, the ink touches outside air at a nozzle provided at a head. Hence, at a nozzle not used for printing, agglomeration is caused easily as a result of evaporation of a solvent. In response to this, a circulation system of supplying the ink to the head and recovering the ink from the head is employed, thereby reducing retention of the ink in the head to suppress agglomeration in the nozzle. A printing apparatus employing the circulation system is described in Japanese Patent Application Laid-Open No. 2014-151528, for example.

In the printing apparatus described in Japanese Patent Application Laid-Open No. 2014-151528, an ink circulation circuit is formed using a buffer tank (103), an ink temperature regulation bath (108), a sub-tank (104), and a head (101). This circulation circuit receives ink supplied to the buffer tank (103) from an external ink supplier (ink tank, 102).

In the inkjet printing apparatus, in order to control the viscosity of the ink properly in the head, the temperature of the ink to be fed to the head is controlled in some cases. In the printing apparatus described in Japanese Patent Application Laid-Open No. 2014-151528, the temperature-regulated ink is fed to the head (101) from the sub-tank (104) upstream from the head in such a manner that the ink is fed at a constant total flow rate independently of an ejection amount of the ink at the head. By doing so, the temperature of the ink is set within an intended range.

In the printing apparatus with the foregoing ink circulation circuit, the ink is supplied to the circulation circuit from an external side that is generally an ink tank (external tank) having a large capacity purchased from an ink manufacturer. If the ink in the external tank is exhausted and the external tank is to be changed, the external tank cannot always be changed immediately after a remaining amount of the ink becomes zero. This causes a problem that a remaining amount in the ink tank in the ink circulation circuit becomes low.

A similar problem is also caused on the occurrence of malfunction of a pump provided in a supply route from the external tank to the circulation circuit. This situation is manageable without stopping a printing process if the malfunction of the pump can be fixed within a certain period of time. However, this causes a problem that a remaining amount in the ink tank in the ink circulation circuit becomes low during the fixing.

In such a case, a remaining amount of the ink becomes low in a tank for temperature regulation of the ink. Hence, if the ink is supplied at a high flow rate after restarting supply of the ink from the external tank into the circulation circuit, the ink in this tank cannot be temperature-regulated in time, causing a risk of rapid temperature decrease of the ink in the circulation circuit.

SUMMARY OF THE INVENTION

The present invention has been made in view of the foregoing circumstances. In a printing apparatus including an ink circulation circuit having a temperature regulating function, the present invention is intended to provide a technique allowing ink to be supplied properly from an external tank into the circulation circuit.

To solve the above-described problem, a first aspect of the present invention is intended for an ink supplier that supplies ink to a plurality of heads in an inkjet printing apparatus, comprising: an ink tank storing the ink; an ink supply route along which the ink is supplied from the ink tank to the heads; an ink feedback route along which the ink is returned from the heads to the ink tank; an ink heater that heats the ink in the ink tank; an external tank storing the ink to be supplied to the ink tank; an ink replenishment route along which the ink is supplied from the external tank to the ink tank; an ink replenishment pump interposed in the ink replenishment route; a temperature detector that detects an in-tank temperature corresponding to the temperature of the ink in the ink tank or in the ink supply route; a storage amount detector that detects an ink storage amount in the ink tank; and a controller that controls the flow rate of the ink in each of the ink supply route, the ink feedback route, and the ink replenishment route. The controller allows the ink replenishment pump to be driven in a flow rate regulation mode in which a flow rate at the ink replenishment pump is regulated in such a manner that the temperature of the ink in the ink tank falls within a predetermined temperature range. The controller calculates the flow rate at the ink replenishment pump in the flow rate regulation mode on the basis of at least the in-tank temperature detected by the temperature detector and the ink storage amount detected by the storage amount detector.

According to a second aspect of the present invention, in the ink supplier according to the first aspect, if the ink storage amount detected by the storage amount detector is equal to or greater than a predetermined low remaining amount threshold, the controller drives the ink replenishment pump in a normal mode in which the flow rate at the ink replenishment pump is set to a predetermined flow rate, and if the ink storage amount detected by the storage amount detector is less than the predetermined low remaining amount threshold, the controller drives the ink replenishment pump in the flow rate regulation mode.

According to a third aspect of the present invention, the ink supplier according to the first aspect further comprises an external temperature detector that detects an external temperature corresponding to an ambient temperature around the external tank or the temperature of the ink in the external tank. The controller calculates the flow rate at the ink replenishment pump in the flow rate regulation mode on the basis of at least the in-tank temperature detected by the temperature detector, the ink storage amount detected by the storage amount detector, and the external temperature detected by the external temperature detector.

According to a fourth aspect of the present invention, the ink supplier according to the first aspect further comprises an outflow amount detector that detects an ink outflow amount of the ink outflowing from the ink tank to the ink supply route. The controller calculates the flow rate at the ink replenishment pump in the flow rate regulation mode on the basis of at least the in-tank temperature detected by the temperature detector, the ink storage amount detected by the storage amount detector, and the ink outflow amount detected by the outflow amount detector.

According to a fifth aspect of the present invention, in the ink supplier according to the fourth aspect, the outflow amount detector is a flow rate sensor that detects the ink outflow amount directly.

According to a sixth aspect of the present invention, in the ink supplier according to the fourth aspect, the outflow amount detector is a calculation unit of the controller that calculates the ink outflow amount using an ink ejection amount at the heads.

According to a seventh aspect of the present invention, in the ink supplier according to the second aspect, the controller drives the ink replenishment pump in the normal mode in such a manner that the ink storage amount detected by the storage amount detector becomes equal to or greater than a first reference amount and less than a second reference amount, and both the first reference amount and the second reference amount are greater than the low remaining amount threshold.

According to the first to seventh aspects of the present invention, in the printing apparatus including the ink circulation circuit having the temperature regulating function, it is possible to supply the ink properly from the external tank into the circulation circuit.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
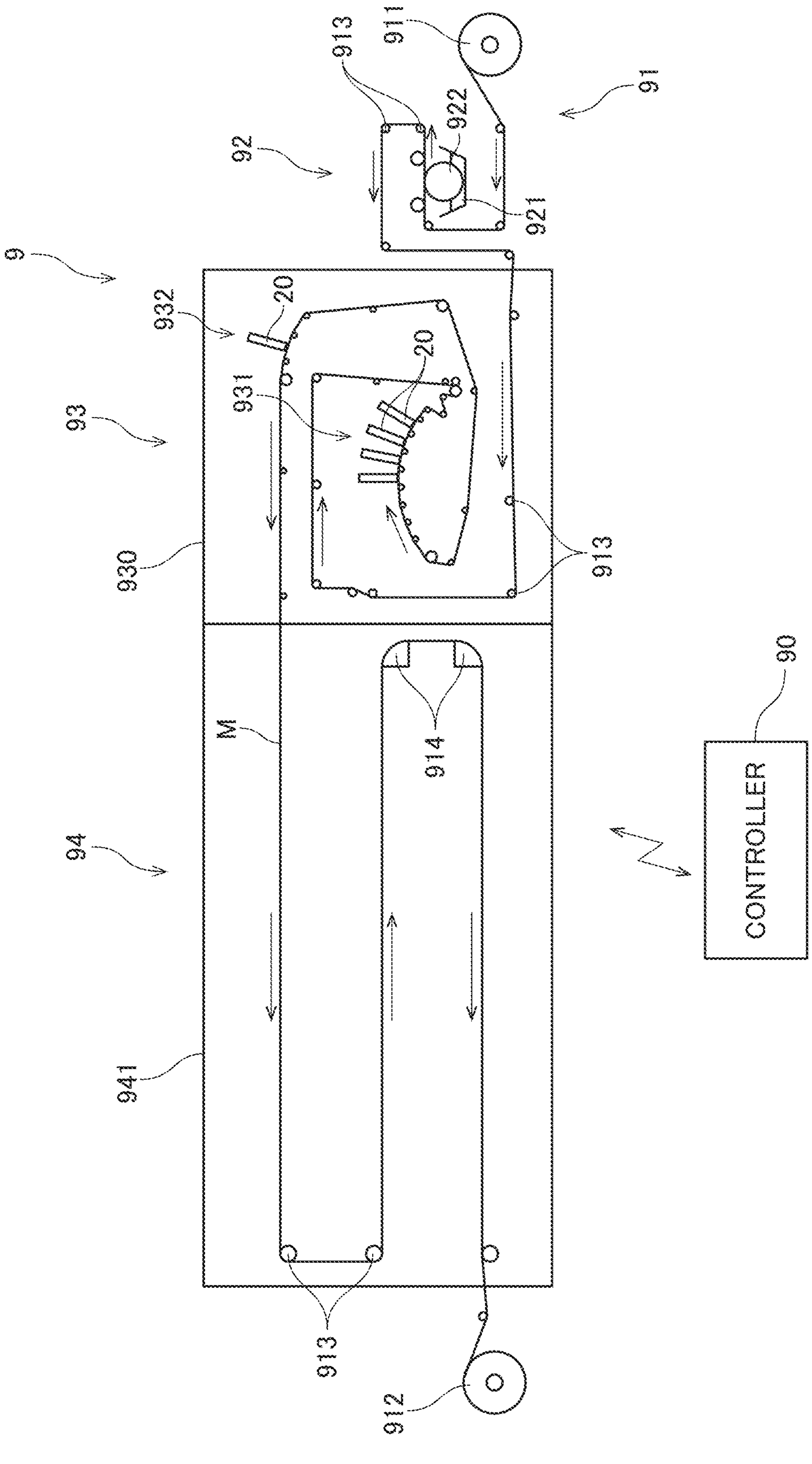
FIG. 1 is a schematic view of a printing apparatus.

A preferred embodiment of the present invention will be described below by referring to the drawings.

1. Configuration of Printing Apparatus

A printing apparatus 9 including an ink supplier 1 according to one preferred embodiment of the present invention will be described below by referring to FIG. 1. FIG. 1 is a schematic view of the printing apparatus 9. The printing apparatus 9 performs a coating process, a printing process, and a drying process on an elongated strip-shaped printing medium M while conveying the printing medium M by causing a controller 90 to control each part of the apparatus.

More specifically, the printing apparatus 9 is a printing apparatus that ejects ink of a watercolor pigment type in an inkjet method to an elongated strip-shaped film sheet for flexible packaging. The printing medium M is composed of a film made of a material such as orientated polypropylene (OPP) or polyethylene terephthalate (PET). However, the material of the printing medium M is not limited to a resin film but may be a different material such as paper. Of two surfaces of the printing medium M, a surface on which an image is to be printed is called a front surface and a surface on the opposite side to the front surface is called a back surface.

The printing apparatus 9 includes a conveyance mechanism 91, a coating processor 92, a printing processor 93, and a drying processor 94.

The conveyance mechanism 91 is a mechanism for conveying the printing medium M along a predetermined conveyance route. The conveyance mechanism 91 includes a feed roller 911, a take-up roller 912, and a large number of other conveyance rollers 913. The feed roller 911, the take-up roller 912, and some of the conveyance rollers 913 are rotating rollers that are caused to rotate by a motor, for example. Some of the other conveyance rollers 913 are driven rollers that are caused to rotate in response to the motion of the printing medium M.

When the printing apparatus 9 is driven, the feed roller 911, the take-up roller 912, and the rotating rollers as some of the conveyance rollers 913 rotate to feed the printing medium M from the feed roller 911. After the printing medium M is subjected to the coating process by the coating processor 92, the printing process by the printing processor 93, and the drying process by the drying processor 94, the printing medium M is taken-up by the take-up roller 912. In FIG. 1, arrows representing a conveyance direction are given to the front surface side of the printing medium M.

The coating processor 92 is a unit for coating the front surface of the printing medium M with a liquid primer (coating liquid). The coating processor 92 includes a pan 921 and a gravure roller 922. The pan 921 stores the liquid primer therein. The gravure roller 922 is a roller for coating the front surface of the printing medium M conveyed by the conveyance mechanism 91 with the primer. The gravure roller 922 is arranged in such a manner as to be partially dipped in the primer stored in the pan 921.

The gravure roller 922 rotates relative to the printing medium M conveyed with the front surface placed on a lower side while holding the primer on an outer peripheral surface of the gravure roller 922, thereby coating the front surface of the printing medium M with the primer. A direction of travel of the printing medium M and a direction of rotation of the gravure roller 922 are opposite to each other. Specifically, the gravure roller 922 coats the front surface of the printing medium M with the primer in a so-called reverse kiss method.

The printing processor 93 includes a housing 930, a color printing unit 931, and a white printing unit 932. The color printing unit 931 and the white printing unit 932 are arranged in the housing 930. The color printing unit 931 ejects inks of a plurality of colors from above to the printing medium M conveyed with the front surface placed on an upper side. In this preferred embodiment, the color printing unit 931 has four head units from which inks of respective colors are ejected. The inks ejected at the color printing unit 931 are inks of cyan, magenta, yellow, and black, for example. The white printing unit 932 ejects a white ink from above to the printing medium M conveyed with the front surface placed on an upper side. The white printing unit 932 has one head unit from which an ink of white is ejected.

A detailed configuration of the head unit 20 and a detailed configuration of the ink supplier 1 for supplying ink to a plurality of heads 21 of the head unit 20 will be described later.

The printing processor 93 further includes a preliminary drying unit (not shown in the drawings) provided downstream from the color printing unit 931 and upstream from the white printing unit 932, and a preliminary drying unit (not shown in the drawings) provided downstream from the white printing unit 932. These drying units are used for drying ink ejected to the front surface of the printing medium M.

The drying processor 94 is a unit for drying the ink ejected to the front surface of the printing medium M at the printing processor 93. The drying processor 94 includes a drying furnace 941 as a housing. In the drying furnace 941, the conveyance mechanism 91 forms an S-shape conveyance route for the printing medium M. Instead of the conveyance roller 913, the conveyance mechanism 91 includes air turn bars 914 provided at positions to touch the front surface of the printing medium M in the drying furnace 941.

The controller 90 is configured using a computer including a processor such as a CPU, a memory such as a RAM, and a storage part such as a hard disk drive, for example. The printing apparatus 9 controls the operations of the conveyance mechanism 91, the coating processor 92, the printing processor 93, and the drying processor 94 described above, and the operation of each part of the ink supplier 1 described later according to a computer program. By doing so, the printing process proceeds in the printing apparatus 9.

2. Configuration of Ink Supplier

The configuration of the ink supplier 1 for supplying ink to the plurality of heads 21 of the head unit 20 will be described next by referring to FIG. 2.

Figure 2:
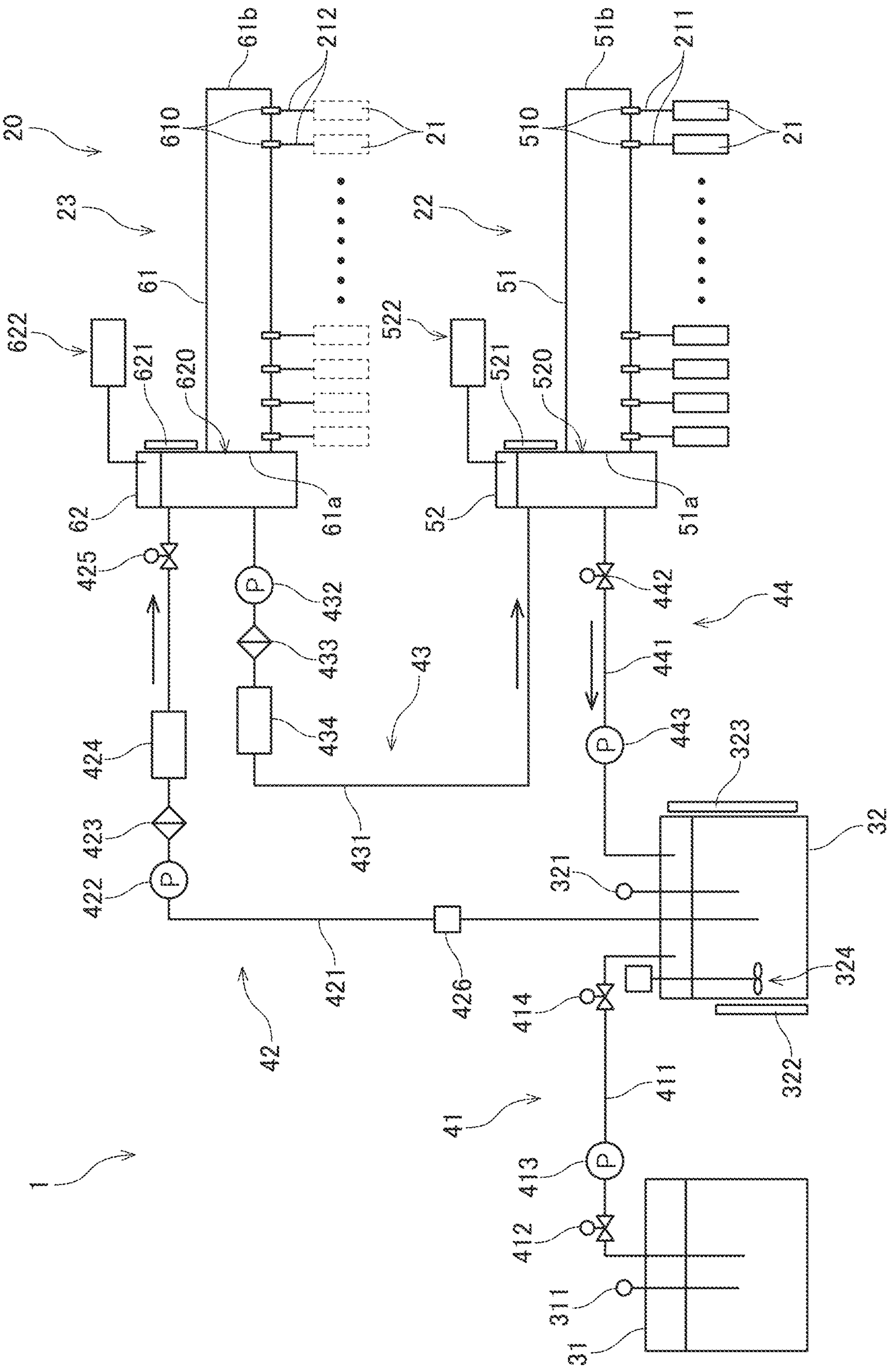
FIG. 2 is a schematic view of an ink supplier.

As shown in FIG. 2, the head unit 20 includes the plurality of heads 21 aligned in a horizontal direction and in a width direction of the printing medium M. In FIG. 1, the head unit 20 is arranged in a direction perpendicular to the plane of paper. In FIG. 2, a plurality of the heads 21 indicated by dashed lines and connected to a recovery reservoir 23 are the same as a plurality of the heads 21 indicated by solid lines and connected to a supply reservoir 22, and are illustrated as duplicates of the others for the convenience of the configuration in the drawing.

The ink supplier 1 includes the supply reservoir 22 and the recovery reservoir 23 of the head unit 20, an external tank 31, and an ink tank 32 that function as storages of the ink. The ink supplier 1 includes a first transport unit 41, a second transport unit 42, a third transport unit 43, and a fourth transport unit 44 that function as means of transporting the ink between corresponding storages.

The head unit 20 is equipped with the plurality of heads 21, the supply reservoir 22, and the recovery reservoir 23. Each of the heads 21 has a plurality of ejection nozzles provided at a surface of the bottom thereof for ejecting the ink to the printing medium M.

The supply reservoir 22 is an ink storage storing the ink to be supplied to the head 21. The supply reservoir 22 includes a first horizontal reservoir 51 and a first vertical reservoir 52.

The first horizontal reservoir 51 is a cylindrical storage extending substantially horizontally in the alignment direction of the plurality of heads 21. The first horizontal reservoir 51 has one end communicably connected to the first vertical reservoir 52. The other end of the first horizontal reservoir 51 is closed. The first horizontal reservoir 51 has a bottom provided with a plurality of supply ports 510 making communication between the inside and outside of the first horizontal reservoir 51 in a top-bottom direction. Each of the supply ports 510 is communicably connected via a supply pipe 211 to the head 21 arranged below the corresponding supply port 510.

The first vertical reservoir 52 is a storage having a covered cylindrical shape with a closed bottom. The first vertical reservoir 52 is larger in the top-bottom direction than the first horizontal reservoir 51. The first vertical reservoir 52 has a side surface with a first opening 520 directly communicating with the one end of the first horizontal reservoir 51.

The first vertical reservoir 52 includes a level sensor 521. A detection signal from the level sensor 521 allows the controller 90 to determine the amount of the ink stored in the supply reservoir 22. The level sensor 521 may be a floating level sensor or a level sensor of a different type.

In the supply reservoir 22, an ink storage amount is adjusted in such a manner as to fill the first horizontal reservoir 51 with the ink and generate a gas layer having a certain volume or more at the top of the first vertical reservoir 52. The gas layer in the first vertical reservoir 52 is connected to a pressure regulator 522. By doing so, a pressure in the first vertical reservoir 52 is maintained at a predetermined supply reservoir negative pressure.

The recovery reservoir 23 is an ink storage storing the ink recovered from the head 21. The recovery reservoir 23 includes a second horizontal reservoir 61 and a second vertical reservoir 62.

The second horizontal reservoir 61 is a cylindrical storage extending substantially horizontally in the alignment direction of the plurality of heads 21. The second horizontal reservoir 61 has one end communicably connected to the second vertical reservoir 62. The other end of the second horizontal reservoir 61 is closed. The second horizontal reservoir 61 has a bottom provided with a plurality of recovery ports 610 making communication between the inside and outside of the second horizontal reservoir 61 in the top-bottom direction. Each of the recovery ports 610 is communicably connected via a recovery pipe 212 to the head 21 arranged below the corresponding recovery port 610.

The second vertical reservoir 62 is a storage having a covered cylindrical shape with a closed bottom. The second vertical reservoir 62 is larger in the top-bottom direction than the second horizontal reservoir 61. The second vertical reservoir 62 has a side surface with a second opening 620 directly communicating with the one end of the second horizontal reservoir 61.

The second vertical reservoir 62 includes a level sensor 621. A detection signal from the level sensor 621 allows the controller 90 to determine the amount of the ink stored in the recovery reservoir 23. The level sensor 621 may be a floating level sensor or a level sensor of a different type.

In the recovery reservoir 23, an ink storage amount is adjusted in such a manner as to fill the second horizontal reservoir 61 with the ink and generate a gas layer having a certain volume or more at the top of the second vertical reservoir 62. The gas layer in the second vertical reservoir 62 is connected to a pressure regulator 622. By doing so, a pressure in the second vertical reservoir 62 is maintained at a predetermined recovery reservoir negative pressure. The recovery reservoir negative pressure is smaller than the supply reservoir negative pressure. Specifically, a difference between atmospheric pressure and the recovery reservoir negative pressure is larger than a difference between atmospheric pressure and the supply reservoir negative pressure.

The external tank 31 is an ink storage having a maximum capacity for ink storage. The external tank 31 stores the ink to be supplied to the ink tank 32. As an example, ink in a tank purchased from an ink manufacturer is used as it is as the external tank 31. He external tank 31 is arranged in a region separated from the head unit 20 and the ink tank 32.

The external tank 31 is provided with an external temperature sensor 311. The external temperature sensor 311 of this preferred embodiment is an "external temperature detector" that detects an "external temperature" corresponding to the temperature of the ink in the external tank 31. The external temperature sensor 311 as the external temperature detector may detect an ambient temperature around the external tank 31 as the external temperature.

The ink tank 32 stores the ink temporarily. An ink storage amount in the ink tank 32 is smaller than that in the external tank 31 and greater than those in the supply reservoir 22 and the recovery reservoir 23.

The ink tank 32 is provided with a temperature sensor 321, a heater 322, a level sensor 323, and an agitating unit 324.

The temperature sensor 321 detects the temperature of the ink stored in the ink tank 32. The temperature sensor 321 is a "temperature detector" that detects the "in-tank temperature" corresponding to the temperature of the ink in the ink tank 32.

The heater 322 is attached to an outer wall of the ink tank 32. The heater 322 is an "ink heater" that heats the ink in the ink tank 32. The controller 90 controls the heater 322 on the basis of the temperature of the ink detected by the temperature sensor 321.

The level sensor 323 detects the height of the ink stored in the ink tank 32, and outputs result of the detection to the controller 90. Specifically, the level sensor 323 is a "storage amount detector" that detects an ink storage amount in the ink tank 32. The agitating unit 324 agitates the ink stored in the ink tank 32 to prevent non-uniformity of heating and non-uniformity of concentration.

The first transport unit 41 transports the ink from the external tank 31 to the ink tank 32. The first transport unit 41 includes a pipe 411, a valve 412, an ink replenishment pump 413, and a valve 414. The valve 412, the ink replenishment pump 413, and the valve 414 are interposed in the pipe 411. The pipe 411 has one end placed in an ink storage region in the external tank 31. The other end of the pipe 411 communicates with the inside of the ink tank 32. The valves 412 and 414 are opened and the ink replenishment pump 413 is actuated by the controller 90, thereby feeding the ink stored in the external tank 31 to the ink tank 32 via the pipe 411.

The second transport unit 42 transports the ink from the ink tank 32 to the recovery reservoir 23. The second transport unit 42 includes a pipe 421, a pump 422, a filter 423, a degassing unit 424, and a valve 425. The pump 422, the filter 423, the degassing unit 424, and the valve 425 are interposed in the pipe 421. The pipe 421 has one end placed in an ink storage region in the ink tank 32. The other end of the pipe 421 communicates with the inside of the second vertical reservoir 62 of the recovery reservoir 23. The filter 423 removes a solid component such as an agglomeration or a precipitate from the ink. The degassing unit 424 removes air bubbles from the ink or part of a gas component dissolving in the ink. The valve 425 is opened and the pump 422 is actuated by the controller 90, thereby feeding the ink stored in the ink tank 32 to the second vertical reservoir 62 via the pipe 421. The pipe 421 is further provided with a flow rate sensor 426 for detecting the flow rate of the ink in the pipe 421.

The third transport unit 43 transports the ink from the recovery reservoir 23 to the supply reservoir 22. The third transport unit 43 includes a pipe 431, a pump 432, a filter 433, and a degassing unit 434. The pump 432, the filter 433, and the degassing unit 434 are interposed in the pipe 431. The pipe 431 has one end placed in an ink storage region in the second vertical reservoir 62 of the recovery reservoir 23. The other end of the pipe 431 communicates with the inside of the first vertical reservoir 52 of the supply reservoir 22. The filter 433 removes a solid component such as an agglomeration or a precipitate from the ink. The degassing unit 434 removes air bubbles from the ink or part of a gas component dissolving in the ink. The pump 432 is actuated by the controller 90, thereby feeding the ink stored in the second vertical reservoir 62 of the recovery reservoir 23 to the first vertical reservoir 52 of the supply reservoir 22 via the pipe 431.

The fourth transport unit 44 transports the ink from the supply reservoir 22 to the ink tank 32. The fourth transport unit 44 includes a pipe 441, a valve 442, and a pump 443. The valve 442 and the pump 443 are interposed in the pipe 441. The pipe 441 has one end placed in an ink storage region in the first vertical reservoir 52 of the supply reservoir 22. The other end of the pipe 441 communicates with the inside of the ink tank 32. The pump 443 is actuated by the controller 90, thereby feeding the ink stored in the first vertical reservoir 52 of the supply reservoir 22 to the ink tank 32 via the pipe 441.

With the above-described configuration, an ink circulation route is formed using the supply reservoir 22, the plurality of supply pipes 211, heads 21 and recovery pipes 212, the recovery reservoir 23, and the third transport unit 43. When the pump 432 of the third transport unit 43 is driven, the ink is supplied from the second vertical reservoir 62 of the recovery reservoir 23 into the first vertical reservoir 52 of the supply reservoir 22. This generates a flow of the ink by which the ink flows from the first vertical reservoir 52, passes through the first horizontal reservoir 51, the plurality of supply pipes 211, heads 21 and recovery pipes 212, and the second horizontal reservoir 61 of the recovery reservoir 23, and then returns to the second vertical reservoir 62. This ink circulation route is called inside-head-unit circulation.

As described above, the recovery reservoir negative pressure is smaller than the supply reservoir negative pressure. Namely, a pressure in the second horizontal reservoir 61 of the recovery reservoir 23 is smaller than a pressure in the first horizontal reservoir 51 of the supply reservoir 22. Thus, regarding each of the heads 21, a smaller pressure in the second horizontal reservoir 61 communicating with the recovery pipe 212 than a pressure in the first horizontal reservoir 51 communicating with the supply pipe 211 generates a flow of the ink in the head 21 from the supply pipe 211 toward the recovery pipe 212.

An ink circulation route is further formed using the ink tank 32, the second transport unit 42, the recovery reservoir 23, the third transport unit 43, the supply reservoir 22, and the fourth transport unit 44. Transporting the ink simultaneously at the second transport unit 42, the third transport unit 43, and the fourth transport unit 44 generates a flow of the ink by which the ink flows from the ink tank 32, passes through the second transport unit 42, the recovery reservoir 23, the third transport unit 43, the supply reservoir 22, and the fourth transport unit 44, and then returns to the ink tank 32. This ink circulation route is called outside-head-unit circulation.

When the ink is ejected from the head 21 to reduce the ink in the supply reservoir 22 in a printing step or a maintenance step on the head 21, an ink liquid surface in the first vertical reservoir 52 is lowered. In such a case, the controller 90 recognizes the reduction in a liquid surface level in the first vertical reservoir 52 in response to a detection signal from the level sensor 521. Then, the controller 90 starts transport of the ink at the second transport unit 42 and the third transport unit 43 in such a manner that a liquid surface level detected by each of the level sensor 521 and the level sensor 621 falls within a predetermined range. If the ink is already being transported by the inside-head-unit circulation or the outside-head-unit circulation, the controller 90 increases the amount of the ink to be transported at each of the second transport unit 42 and the third transport unit 43.

If the ink in the ink tank 32 is reduced by supplying the ink from the ink tank 32 to the head unit 20, an ink liquid surface in the ink tank 32 is lowered. In such a case, the controller 90 recognizes the reduction in a liquid surface level in the ink tank 32 in response to a detection signal from the level sensor 323. Then, the controller 90 transports the ink at the first transport unit 41 in such a manner that a liquid surface level detected by the level sensor 323 falls within a predetermined range.

In this preferred embodiment, the first transport unit 41 corresponds to an “ink replenishment route” 71 along which the ink is supplied from the external tank 31 to the ink tank 32. The second transport unit 42, the recovery reservoir 23, the third transport unit 43, and the supply reservoir 22 correspond to an “ink supply route” 72 along which the ink is supplied from the ink tank 32 to the head 21. The recovery reservoir 23, the third transport unit 43, the supply reservoir 22, and the fourth transport unit 44 correspond to an “ink feedback route” 73 along which the ink is returned from the head 21 to the ink tank 32. The flow rate sensor 426 is an “outflow amount detector” that detects an ink outflow amount of the ink outflowing from the ink tank 32 to the second transport unit 42 corresponding to the ink supply route. The outflow amount detector is not limited to a detector to detect an ink outflow amount directly like the flow rate sensor 426 of this preferred embodiment. The outflow amount detector may be a calculation unit of the controller 90 that calculates an ink outflow amount using an ink ejection amount at the head 21.

The controller 90 controls the flow rate of the ink in each of the ink replenishment route 71, the ink supply route 72, and the ink feedback route 73. If an ink storage amount detected by the level sensor 323 is equal to or greater than a predetermined threshold, the controller 90 drives the ink replenishment pump 413 in a normal mode. If the ink storage amount detected by the level sensor 323 is less than the predetermined threshold, the controller 90 drives the ink replenishment pump 413 in a flow rate regulation mode.

The ink supply route 72 and the ink feedback route 73 form an ink circulation circuit having a temperature regulating function. Meanwhile, the ink replenishment route 71 is a route along which the ink not having been temperature-regulated is replenished from the external tank 31 to the ink circulation circuit. In the normal mode conventionally employed, the controller 90 replenishes the ink from the external tank 31 to the ink tank 32 with a flow rate at the ink replenishment pump 413 set to a predetermined flow rate. If a remaining amount in the ink tank 32 is sufficient, a problem of rapid temperature decrease of the ink in the ink tank 32 is unlikely to occur in the normal mode.

However, if a significant amount of time has passed from when the external tank 31 becomes empty to when the external tank 31 is changed, for example, a remaining amount becomes low in the ink tank 32. In this case, if the ink is replenished from the external tank 31 to the ink tank 32 in the normal mode with a flow rate at the ink replenishment pump 413 set to the predetermined flow rate until an intended ink storage amount is fulfilled, the problem of rapid temperature decrease of the ink in the ink tank 32 occurs easily.

In response to this, in the ink supplier 1, the flow rate regulation mode is prepared for the process of replenishing the ink from the external tank 31 to the ink tank 32 in addition to the normal mode. In the flow rate regulation mode, the controller 90 regulates a flow rate at the ink replenishment pump 413 in such a manner that the temperature of the ink in the ink tank 32 falls within a predetermined temperature range. In doing this, the controller 90 calculates a flow rate at the ink replenishment pump 413 on the basis of at least an in-tank temperature detected by the temperature sensor 321 and an ink storage amount detected by the level sensor 323. In this preferred embodiment, the controller 90 further uses an external temperature detected by the external temperature sensor 311 and an ink outflow amount detected by the flow rate sensor 426 as bases for calculating the flow rate at the ink replenishment pump 413. Thus, in the printing apparatus 9 including the ink circulation circuit having the temperature regulating function (the ink supply route 72 and the ink feedback route 73), it is possible to supply the ink properly from the external tank 31 to the ink tank 32 in the circulation circuit.

3. Regulation of Ink Replenishment Amount in Normal Mode and Flow Rate Regulation Mode Described next is the process of replenishing the ink from the external tank 31 to the ink tank 32 by the ink supplier 1. In the ink replenishment process by the ink supplier 1, the controller 90 uses two modes including the normal mode and the flow rate regulation mode.

In the normal mode, the controller 90 replenishes the ink to the ink tank 32 in such a manner that an ink storage amount in the ink tank 32 falls within a range of equal to or greater than a predetermined first reference amount and less than a predetermined second reference amount. The normal mode is employed if the ink storage amount in the ink tank 32 detected by the level sensor 323 is equal to or greater than a predetermined low remaining amount threshold. This low remaining amount threshold is a value smaller than the first reference amount. In the normal mode, if the ink storage amount in the ink tank 32 falls below the first reference amount, the controller 90 drives the ink replenishment pump 413 at a predetermined normal flow rate. If this ink storage amount reaches the second reference amount, the controller 90 stops the ink replenishment pump 413.

The “normal flow rate” of this case is set to a flow rate at which, even if the ink is replenished from the external tank 31 at a low ink temperature to an amount from the first reference amount to the second reference amount, it is possible to maintain an ink temperature in the ink tank 32 within an intended range. The “normal flow rate” may be a maximum flow rate at the ink replenishment pump 413 depending on each type of set value such as a difference between the first reference amount and the second reference amount.

In the flow rate regulation mode, the controller 90 drives the ink replenishment pump 413 while regulating a flow rate at the ink replenishment pump 413 in such a manner that the temperature of the ink in the ink tank 32 falls within the predetermined temperature range. The flow rate regulation mode is employed if the ink storage amount in the ink tank 32 detected by the level sensor 323 is less than the predetermined low remaining amount threshold for reason such as exhaustion of the ink in the external tank 31. In this preferred embodiment, the flow rate regulation mode is employed under a condition that the ink storage amount in the ink tank 32 is less than the predetermined low remaining amount threshold and additionally, a condition to be fulfilled by making a judgment in step S104 described later.

Figure 3:
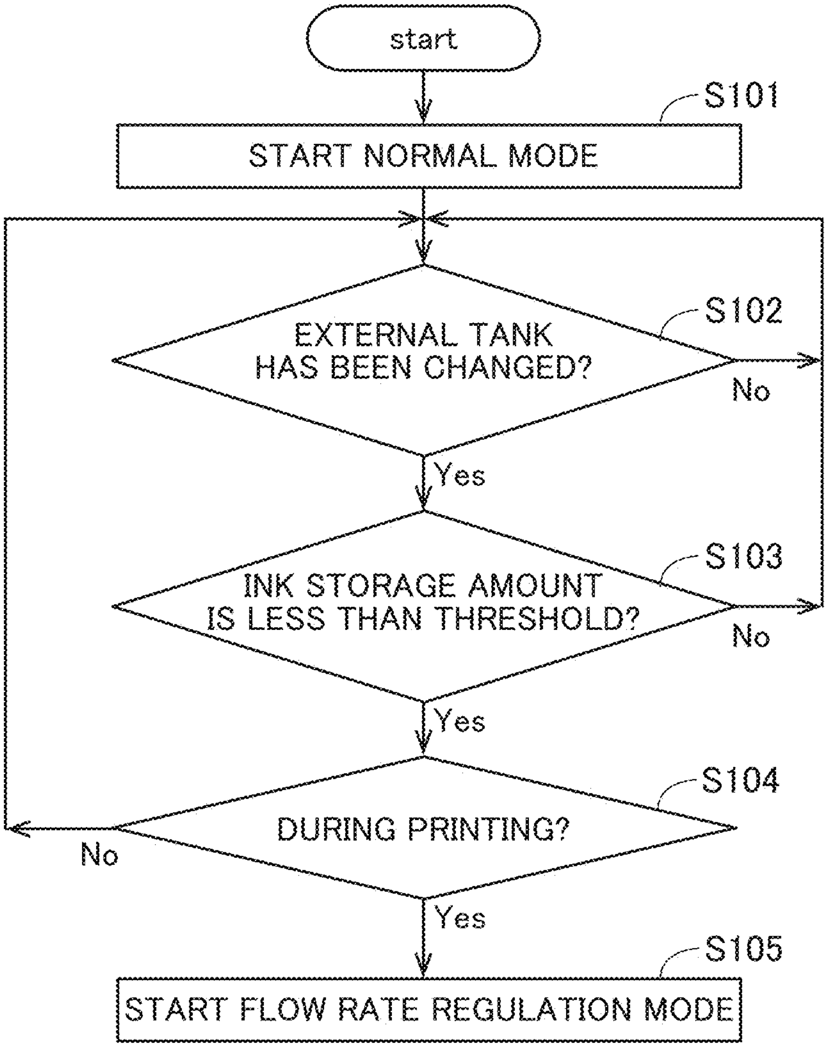
FIG. 3 is a flowchart showing a flow of mode selection for an ink replenishment process in the ink supplier.
Figure 4:
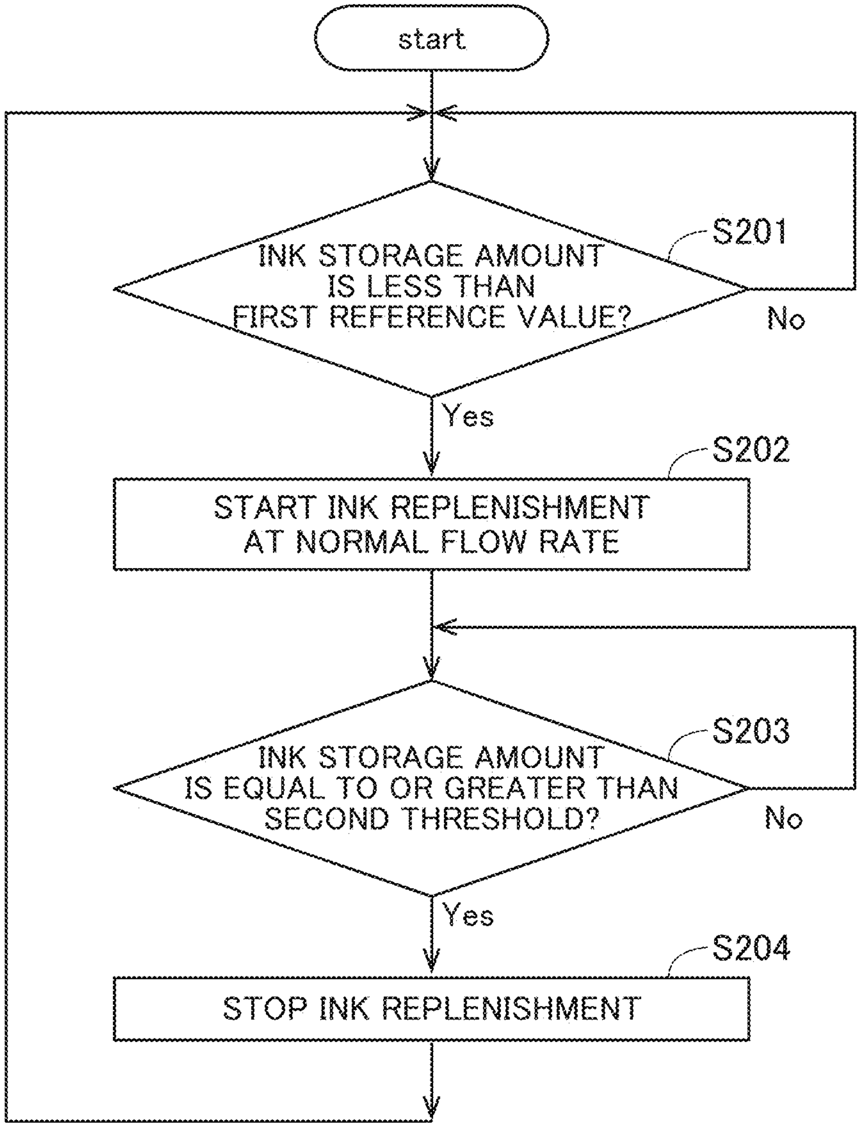
FIG. 4 is a flowchart showing a flow of the ink replenishment process in a normal mode.
Figure 5:
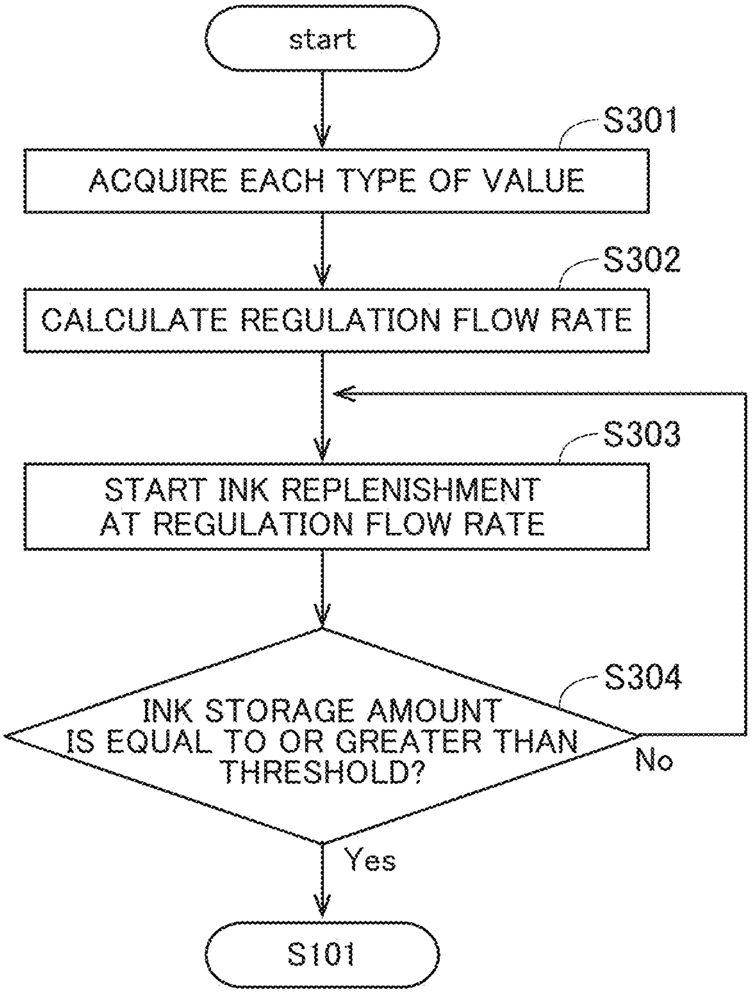
FIG. 5 is a flowchart showing a flow of the ink replenishment process in a flow rate regulation mode.

The following describes mode switching for the ink replenishment process and regulation of an ink replenishment amount in each mode by referring to FIGS. 3 to 5. FIG. 3 is a flowchart showing a flow of mode selection for the ink replenishment process in the ink supplier 1. FIG. 4 is a flowchart showing a flow of the ink replenishment process in the normal mode. FIG. 5 is a flowchart showing a flow of the ink replenishment process in the flow rate regulation mode.

As shown in FIG. 3, when the ink supplier 1 starts the process of replenishing the ink from the external tank 31 to the ink tank 32, the controller 90 first replenishes the ink in the normal mode (step S101).

As shown in FIG. 4, in the ink replenishment process in the normal mode, the controller 90 regularly judges whether the ink storage amount in the ink tank 32 detected by the level sensor 323 is less than the first reference amount (step S201). If the ink storage amount in the ink tank 32 is equal to or greater than the first reference amount (step S201: No), the controller 90 returns to step S201.

If the ink storage amount in the ink tank 32 is less than the first reference amount (step S201: Yes), the controller 90 opens the valves 412 and 414 and drives the ink replenishment pump 413, thereby starting ink replenishment at the normal flow rate (step S202).

When the ink replenishment at the normal flow rate is started in step S202, the controller 90 regularly judges whether the ink storage amount in the ink tank 32 detected by the level sensor 323 is equal to or greater than the second reference amount (step S203). If the ink storage amount in the ink tank 32 is less than the second reference amount (step S203: No), the controller 90 returns to step S203 while continuing the ink replenishment at the normal flow rate.

If the ink storage amount in the ink tank 32 is equal to or greater than the second reference amount (step S203: Yes), the controller 90 stops the ink replenishment pump 413 and closes the valves 412 and 414, thereby stopping the ink replenishment (step S204). Then, the controller 90 returns to step S201.

Description will be continued by referring back to FIG. 3. After the above-described ink replenishment process in the normal mode is started in step S101, the controller 90 checks to see if the external tank 31 has been changed (step S102). In order for the controller 90 to determine that the external tank 31 has been changed, a sensor for detecting removal/mounting of the external tank 31 may be provided or a worker may input a signal to the controller 90 in changing the external tank 31, for example.

If the controller 90 determines that the external tank 31 has been changed (step S102: Yes), the controller 90 next judges whether the ink storage amount in the ink tank 32 detected by the level sensor 323 is less than the low remaining amount threshold (step S103). If the ink storage amount in the ink tank 32 is equal to or greater than the low remaining amount threshold (step S103: No), the controller 90 returns to step S102 while continuing the ink replenishment process in the normal mode.

If the ink storage amount in the ink tank 32 is less than the low remaining amount threshold in step S103 (step S103: Yes), the controller 90 judges whether a printing process on some print job is currently being performed in the printing apparatus 9 (step S104).

If it is judged in step S104 that the printing process is not being performed (step S104: No), the controller 90 returns to step S102 while continuing the ink replenishment at the normal flow rate in the normal mode.

If it is judged in step S104 that the printing process is being performed in the printing apparatus 9 (step S104: Yes), the controller 90 finishes the normal mode and starts the flow rate regulation mode as a mode for the ink replenishment process (step S105).

The flow rate regulation mode will be described next. As shown in FIG. 5, when the flow rate regulation mode is started, the controller 90 first acquires each type of value required for calculating a regulation flow rate (step S301). More specifically, the controller 90 acquires an in-tank temperature detected by the temperature sensor 321, the ink storage amount detected by the level sensor 323, an external temperature detected by the external temperature sensor 311, and an ink outflow amount detected by the flow rate sensor 426.

Next, on the basis of each of the values acquired in step S301, the controller 90 calculates the regulation flow rate at the ink replenishment pump 413 in such a manner that the temperature of the ink in the ink tank 32 falls within the predetermined temperature range (step S302).

When the regulation flow rate is calculated, the controller 90 opens the valves 412 and 414 and drives the ink replenishment pump 413, thereby starting ink replenishment at the calculated regulation flow rate (step S303).

If the ink temperature in the ink tank 32 is desired to be To±α [° C.], for example, a minimum temperature permissible as the ink temperature is calculated as To−α [° C.]. Then, with a current ink temperature in the ink tank 32 defined as Ta [° C.], the ink storage amount in the ink tank 32 as Va [L], and the external temperature corresponding to an ink temperature in the external tank 31 as Tb [° C.], and with a flow rate of feeding from the external tank 31 to the ink tank 32 set to Vb [L/see], an ink temperature Ta' [° C.] in the ink tank 32 one second later without taking heating by the heater 322 into consideration is expressed by the following formula (1):

$$Ta' = (Va * Ta + Vb * Tb)/(Va + Vb) \tag{1}$$

By contrast, if the heater 322 is capable of increasing the temperature of the ink of Va+Vb [L] by ΔT [° C.] in a second, an ink temperature Ta" [° C.] in the ink tank 32 one second later by taking the heating capacity of the heater 322 into consideration is determined as Ta"=Ta'+ΔT and is thus expressed by the following formula (2):

$$Ta'' = (Va * Ta + Vb * Tb)/(Va + Vb) + \Delta T \tag{2}$$

The controller 90 calculates the flow rate of feeding Vb [L/sec] from the external tank 31 to the ink tank 32 Vb in such a manner that Ta" [C] does not fall below To−α [° C.].

When the ink replenishment at the regulation flow rate is started in step S303, the controller 90 regularly judges whether the ink storage amount in the ink tank 32 detected by the level sensor 323 is equal to or greater than the low remaining amount threshold (step S304). If the ink storage amount in the ink tank 32 is less than the low remaining amount threshold (step S304: No), the controller 90 returns to step S303 while continuing the ink replenishment at the regulation flow rate.

If the ink storage amount in the ink tank 32 is equal to or greater than the low remaining amount threshold (step S304: Yes), the controller 90 stops the ink replenishment pump 413 and closes the valves 412 and 414, thereby stopping the ink replenishment (step S204). Then, the controller 90 finishes the flow rate regulation mode and returns to step S101.

4. Modifications

While the preferred embodiment of the present invention has been described above, the present invention is not limited to the above-described embodiment.

In the above-described preferred embodiment, in the process of replenishing the ink from the external tank 31 to the ink tank 32 performed by the ink supplier 1, the condition defined in step S104 is required to be fulfilled for mode switching from the normal mode to the flow rate regulation mode in addition to the condition that an ink storage amount in the ink tank 32 detected by the level sensor 323 is less than the predetermined low remaining amount threshold. However, the present invention is not limited to this. A condition to be fulfilled for mode switching from the normal mode to the flow rate regulation mode may only be the condition that the ink storage amount in the ink tank 32 detected by the level sensor 323 is less than the predetermined low remaining amount threshold.

Figure 6:
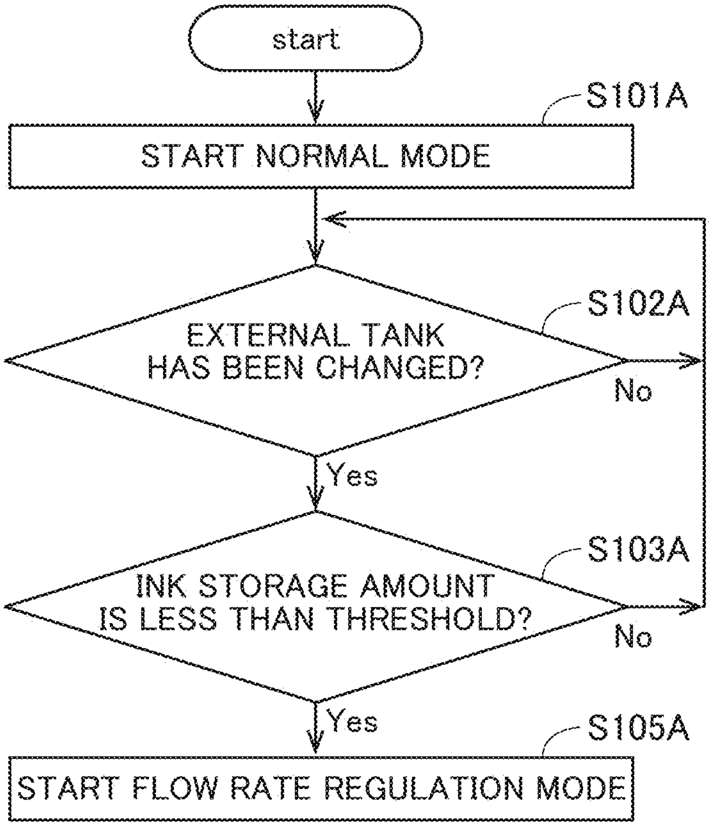
FIG. 6 is a flowchart showing a flow of mode selection for an ink replenishment process in an ink supplier according to a modification.

FIG. 6 is a flowchart showing a flow of mode selection for an ink replenishment process in the ink supplier 1 according to a modification. In the illustration in FIG. 6, a condition for mode switching from the normal mode to the flow rate regulation mode is merely the condition that an ink storage amount in the ink tank 32 detected by the level sensor 323 is less than the predetermined low remaining amount threshold.

According to this modification, step S101A to step S103A are performed in the same way as steps S101 to S103 of the above-described preferred embodiment. If an ink storage amount in the ink tank 32 is equal to or greater than the low remaining amount threshold in step S103A (step S103A: No), the flow returns to step S102A while continuing the ink replenishment process in the normal mode. By contrast, if the ink storage amount in the ink tank 32 is less than the low remaining amount threshold in step S103A (step S103A: Yes), the controller 90 finishes the normal mode and starts the flow rate regulation mode as a mode for the ink replenishment process without making another judgment (step S105A).

Like in the illustration in FIG. 6, a mode may be switched from the normal mode to the flow rate regulation mode simply under one condition.

The ink used in the above-described preferred embodiment is ink of a watercolor pigment type. However, the present invention is not limited to this. The ink may be oil-based ink or dye-based ink.

In the above-described preferred embodiment, the printing apparatus 9 includes the coating processor 92 and the drying processor 94. However, the present invention is not limited to this. The ink supplier of the present invention may be used in a printing apparatus to perform only the printing process.

The components appearing in the above-described embodiment and modifications may be combined together, as appropriate, without inconsistencies.

While the invention has been shown and described in detail, the foregoing description is in all aspects illustrative and not restrictive. It is therefore understood that numerous modifications and variations can be devised without departing from the scope of the invention.

What is claimed is:

1. An ink supplier that supplies ink to a plurality of heads in an inkjet printing apparatus, comprising:
- an ink tank storing said ink;
- an ink supply route along which said ink is supplied from said ink tank to said heads;
- an ink feedback route along which said ink is returned from said heads to said ink tank;
- an ink heater that heats said ink in said ink tank;
- an external tank storing said ink to be supplied to said ink tank;
- an ink replenishment route along which said ink is supplied from said external tank to said ink tank;
- an ink replenishment pump interposed in said ink replenishment route;
- a temperature detector that detects an in-tank temperature corresponding to the temperature of said ink in said ink tank or in said ink supply route;
- a storage amount detector that detects an ink storage amount in said ink tank; and
- a controller that controls a flow rate of said ink in each of said ink supply route, said ink feedback route, and said ink replenishment route, wherein
- said controller allows said ink replenishment pump to be driven in a flow rate regulation mode in which a flow rate at said ink replenishment pump is regulated in such a manner that the temperature of said ink in said ink tank falls within a predetermined temperature range, and
- said controller calculates the flow rate at said ink replenishment pump in said flow rate regulation mode on the basis of at least said in-tank temperature detected by said temperature detector and said ink storage amount detected by said storage amount detector.

2. The ink supplier according to claim 1, wherein
- if said ink storage amount detected by said storage amount detector is equal to or greater than a predetermined low remaining amount threshold, said controller drives said ink replenishment pump in a normal mode in which the flow rate at said ink replenishment pump is set to a predetermined flow rate, and
- if said ink storage amount detected by said storage amount detector is less than said predetermined low remaining amount threshold, said controller drives said ink replenishment pump in said flow rate regulation mode.

3. The ink supplier according to claim 1, further comprising:
- an external temperature detector that detects an external temperature corresponding to an ambient temperature around said external tank or the temperature of said ink in said external tank, wherein said controller calculates the flow rate at said ink replenishment pump in said flow rate regulation mode on the basis of at least said in-tank temperature detected by said temperature detector, said ink storage amount detected by said storage amount detector, and said external temperature detected by said external temperature detector.

4. The ink supplier according to claim 1, further comprising:

an outflow amount detector that detects an ink outflow amount of said ink outflowing from said ink tank to said ink supply route, wherein said controller calculates the flow rate at said ink replenishment pump in said flow rate regulation mode on the basis of at least said in-tank temperature detected by said temperature detector, said ink storage amount detected by said storage amount detector, and said ink outflow amount detected by said outflow amount detector.

5. The ink supplier according to claim 4, wherein said outflow amount detector is a flow rate sensor that detects said ink outflow amount directly.

6. The ink supplier according to claim 4, wherein said outflow amount detector is a calculation unit of said controller that calculates said ink outflow amount using an ink ejection amount at said heads.

7. The ink supplier according to claim 2, wherein said controller drives said ink replenishment pump in said normal mode in such a manner that said ink storage amount detected by said storage amount detector becomes equal to or greater than a first reference amount and less than a second reference amount, and both said first reference amount and said second reference amount are greater than said low remaining amount threshold.

* * * * *